(12) United States Patent
Chang et al.

(10) Patent No.: US 9,256,255 B2
(45) Date of Patent: Feb. 9, 2016

(54) DOCKING STATION

(71) Applicant: Acer Incorporated, New Taipei (TW)

(72) Inventors: Yi-Mu Chang, New Taipei (TW);
Chyun-Nan Liu, New Taipei (TW);
Yan-Lin Kuo, New Taipei (TW);
Ming-Yen Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 292 days.

(21) Appl. No.: 14/056,962

(22) Filed: Oct. 18, 2013

(65) Prior Publication Data
US 2015/0055289 A1 Feb. 26, 2015

(30) Foreign Application Priority Data

Aug. 23, 2013 (TW) .............................. 102130242 A (51) Int. Cl.
*G06F 1/16* (2006.01)
(52) U.S. Cl.
CPC .................................... *G06F 1/1632* (2013.01)
(58) Field of Classification Search
CPC .............................. G06F 1/1626; G06F 1/1632
USPC .................................................... 361/679.41
See application file for complete search history.

(56) References Cited

U.S. PATENT DOCUMENTS

| | | | | |
|---|---|---|---|---|
| 5,619,397 A * | 4/1997 | Honda | ................... | G06F 1/1632 361/679.43 |
| 5,627,727 A * | 5/1997 | Aguilera | ............... | G06F 1/1626 361/679.43 |
| 7,014,486 B1 * | 3/2006 | Wu | ........................ | G06F 1/1632 439/165 |
| 7,381,075 B2 * | 6/2008 | Gontarek | ............ | B60R 11/0241 361/679.41 |
| 8,077,454 B2 * | 12/2011 | Ward | ..................... | G06F 1/1624 361/679.05 |
| 8,199,476 B2 * | 6/2012 | Tian | ....................... | G06F 1/1616 312/223.1 |
| 8,325,476 B2 * | 12/2012 | Huang | ................... | G06F 1/1626 312/223.1 |
| 8,608,123 B2 * | 12/2013 | Takahashi | ............... | H04M 1/04 248/346.01 |
| 8,644,018 B2 * | 2/2014 | Hung | ..................... | G06F 1/1632 16/302 |
| 8,654,522 B2 * | 2/2014 | Ishida | .................. | F16M 11/041 248/346.03 |
| 8,705,231 B2 * | 4/2014 | Shindo | ................. | F16M 11/041 324/756.05 |
| 9,047,049 B2 * | 6/2015 | Yang | ..................... | G06F 1/1626 |
| 2011/0075349 A1 * | 3/2011 | Ma | ......................... | G06F 1/1632 361/679.41 |
| 2013/0107126 A1 * | 5/2013 | Nonomura | ............ | G06F 1/1632 348/725 |
| 2014/0133080 A1 * | 5/2014 | Hwang | .................. | G06F 1/1632 361/679.17 |
| 2014/0177162 A1 * | 6/2014 | Ho | ......................... | G06F 1/1616 361/679.43 |
| 2015/0036283 A1 * | 2/2015 | Suckle | .................. | G06F 1/1632 361/679.43 |

FOREIGN PATENT DOCUMENTS

| | | |
|---|---|---|
| TW | M434419 | 7/2012 |
| TW | 201306715 | 2/2013 |
| TW | 201310206 | 3/2013 |

* cited by examiner

*Primary Examiner* — Anthony Q Edwards
(74) *Attorney, Agent, or Firm* — Jianq Chyun IP Office (57) ABSTRACT

A docking station capable of assembling a portable electronic device is provided. The portable electronic device has a display screen and a slot. The docking station includes a body and a pressing member. The body has a protrusion. The pressing member is movably arranged in the body, so as to be hidden in the body or moved out of the body. When the portable electronic device is locked with the protrusion through the slot, the pressing member is moved out of the body and presses against the portable electronic device along a pressing direction, so that the portable electronic device is fixed onto the body. The pressing direction is perpendicular to the display screen.

20 Claims, 9 Drawing Sheets

DOCKING STATION

CROSS-REFERENCE TO RELATED APPLICATION

This application claims the priority benefit of Taiwan application serial no. 102130242, filed on Aug. 23, 2013. The entirety of the above-mentioned patent application is hereby incorporated by reference herein and made a part of this specification.

BACKGROUND OF THE INVENTION

1. Field of the Invention

The invention relates to a docking station, and more particularly to a docking station of a portable electronic device.

2. Description of Related Art

Owing to the progress towards science and technology, various portable electronic devices including notebook computers, smart phones, and tablet PCs have been launched. Users may access and process data through the portable electronic devices in a timely manner, and therefore the portable electronic devices have become indispensable to our daily lives. For instance, the tablet PC characterized by compact volume and portability can be used even when the user is not at home.

Figure 1:
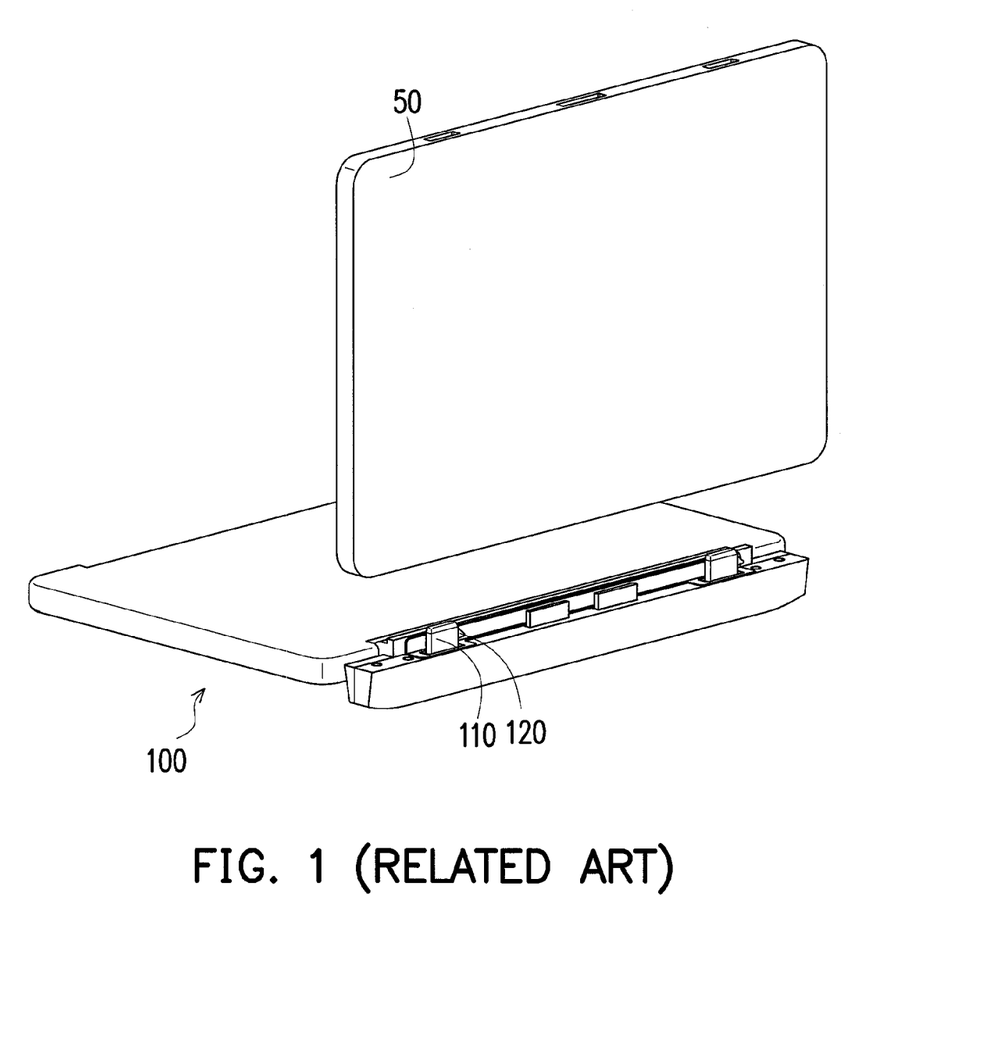
FIG. 1 is a schematic view illustrating a conventional docking station and a tablet PC before assembly.
Figure 2:
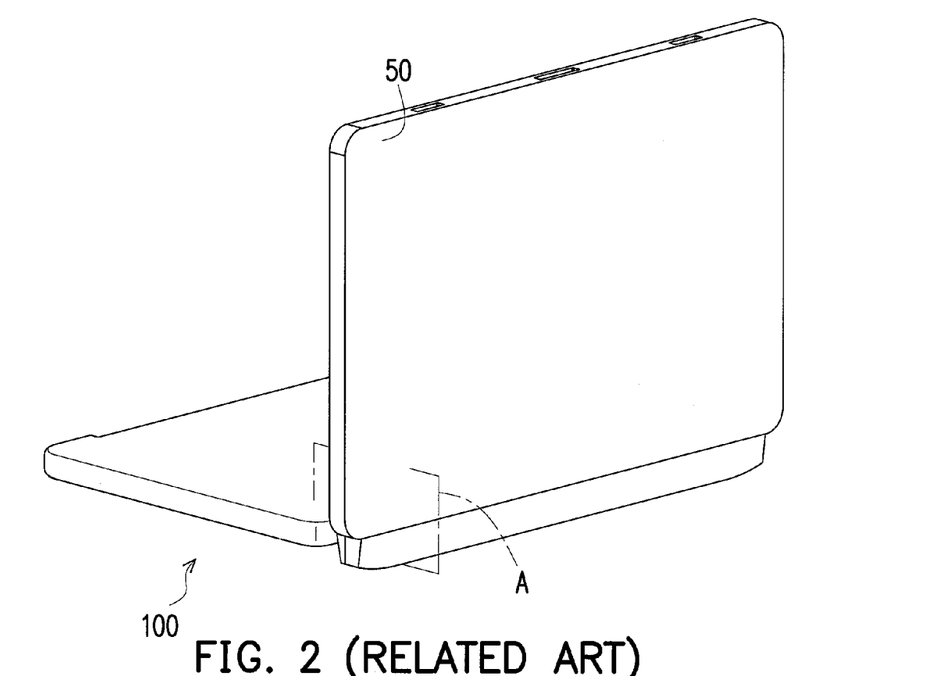
FIG. 2 is a schematic view illustrating the conventional docking station and the tablet PC depicted in FIG. 1 after assembly.
Figure 3:
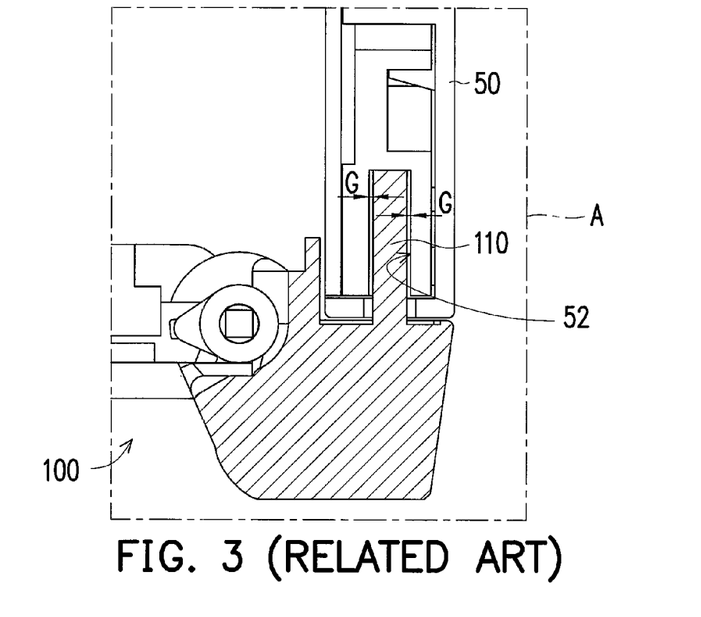
FIG. 3 is a schematic cross-sectional view illustrating the region A in FIG. 2.

However, when using the tablet PC, the user is often required to hold the tablet PC with one hand or horizontally place the tablet PC on the desk. In this case, the user cannot use the tablet PC with ease and is thus likely to suffer from fatigue. Besides, the convenience of using a touch screen does not comply with all users' requirements, and accordingly related docking stations have been gradually developed. FIG. 1 is a schematic view illustrating a conventional docking station and a tablet PC before assembly. FIG. 2 is a schematic view illustrating the conventional docking station and the tablet PC depicted in FIG. 1 after assembly. FIG. 3 is a schematic cross-sectional view illustrating the region A in FIG. 2. With reference to FIG. 1 to FIG. 3, the docking station 100 includes a locking member 110 and a latch 120. The latch 120 is hidden in the locking member 110. When a tablet PC 50 is bonded to the docking station 100, the locking member 110 is installed in a slot 52 of the tablet PC 50 and is locked to the tablet PC 50 by the latch 120. In general, there is a gap G between the locking member 110 and the inner wall of the slot 52 for the sake of assembly. However, when the user uses the tablet PC 50, the tablet PC 50 may tremble due to the gap G, and therefore the quality of using the tablet PC 50 may be negatively affected. As a result, how to provide the docking station with stable support to ensure favorable quality of using the portable electronic device has become one of the issues to be resolved in the computer industry.

SUMMARY OF THE INVENTION

The invention is directed to a docking station where a portable electronic device can be stably lodged.

In an embodiment of the invention, a docking station capable of assembling a portable electronic device is provided. The portable electronic device has a display screen and a slot. The docking station includes a body, a pressing member, and an elastic member. The body has a protrusion. The protrusion is suitable for being lodged in the slot, such that the portable electronic device and the docking station are assembled to each other. The pressing member is movably arranged in the protrusion. The elastic member is located in the protrusion and is in contact with the body and the pressing member. Besides, the elastic member constantly drives the pressing member to be moved out of the protrusion and to press against the inside of the slot along a pressing direction. Here, the pressing direction is perpendicular to the display screen.

In an embodiment of the invention, a docking station capable of assembling a portable electronic device is provided. The portable electronic device has a display screen and a slot. The docking station includes a body, a pressing member, and an elastic member. The body has a protrusion, a recess, and a sliding groove that are adjacent to one another. The pressing member is slidably pivoted to the sliding groove and located in the recess. The elastic member is in contact with the pressing member and the body, and the elastic member constantly drives the pressing member to move into the recess. When the portable electronic device enables the protrusion to be inserted into the slot along an assembling direction, the portable electronic device presses against the pressing member along the assembling direction, so as to drive the pressing member to slide along the sliding groove, rotate, and move out of the recess. Besides, the pressing member presses against the portable electronic device along a pressing direction, such that the portable electronic device is clamped by the pressing member and the protrusion. Here, the assembling direction is parallel to the display screen, and the pressing direction is perpendicular to the display screen.

In view of the above, the docking station described above includes the body and the pressing member. The pressing member is movably arranged in the body, so as to be hidden in the body or moved out of the body. When the portable electronic device is locked with the protrusion of the body through the slot, the pressing member is moved out of the body and presses against the portable electronic device along the pressing direction, so that the portable electronic device is fixed onto the body. Thereby, the support stability of the docking station is significantly improved, and favorable quality of using the portable electronic device can be guaranteed as well.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 4:
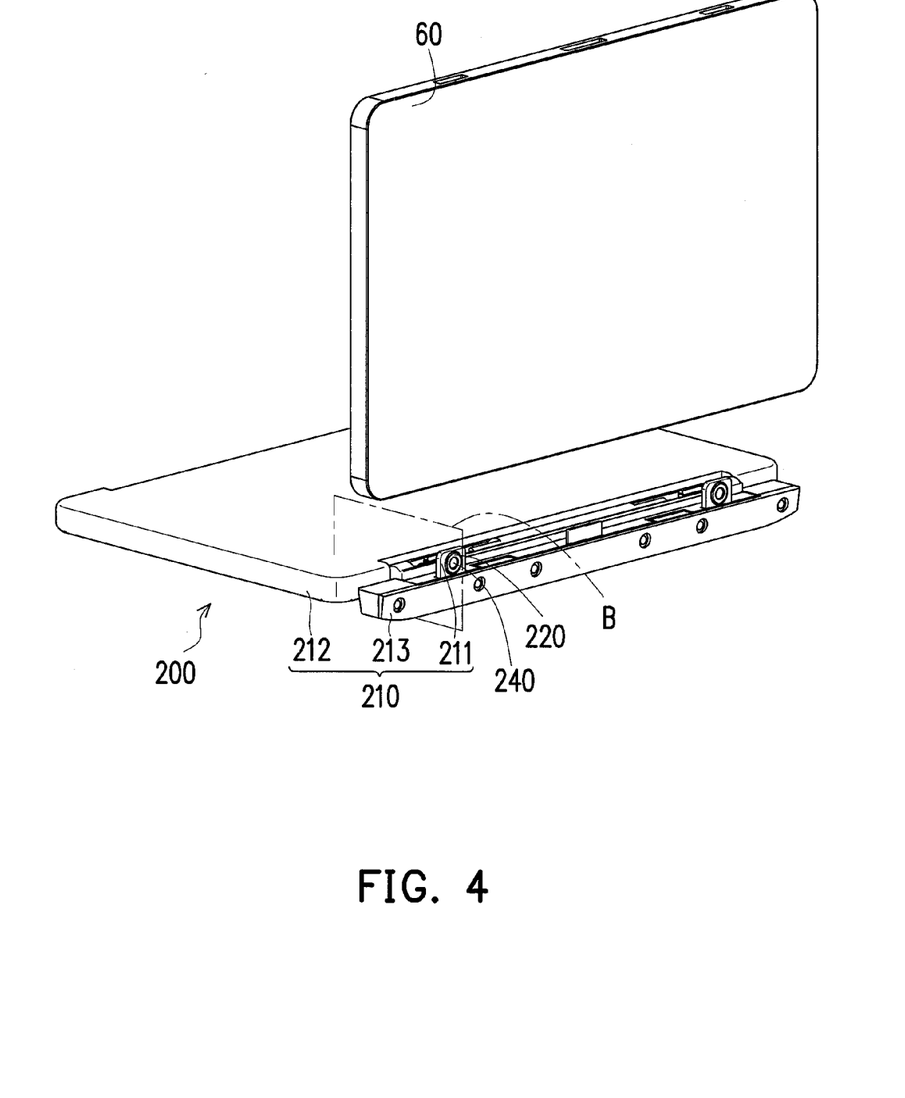
FIG. 4 is a schematic view illustrating a docking station and a portable electronic device before assembly according to an embodiment of the invention.
Figure 5:
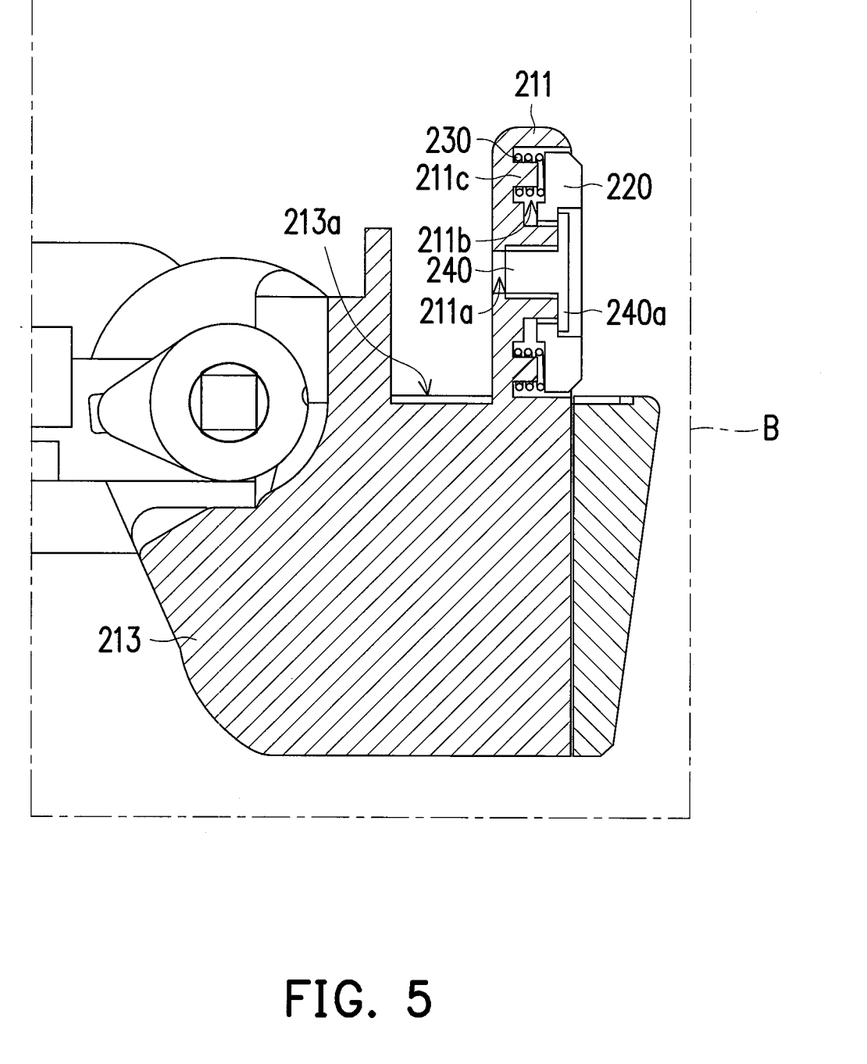
FIG. 5 is a schematic cross-sectional view illustrating the region B depicted in FIG. 4.
Figure 6:
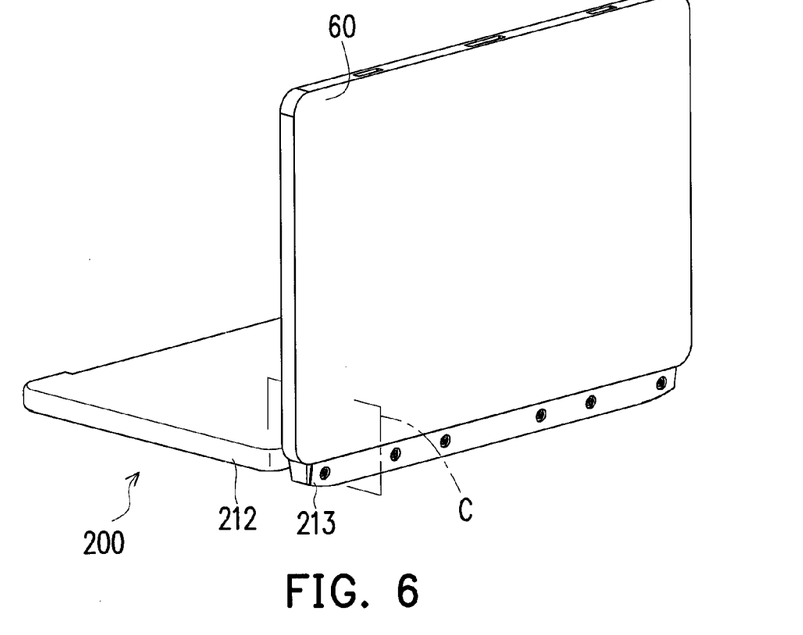
FIG. 6 is a schematic view illustrating the docking station and the portable electronic device depicted in FIG. 4 after assembly.
Figure 7:
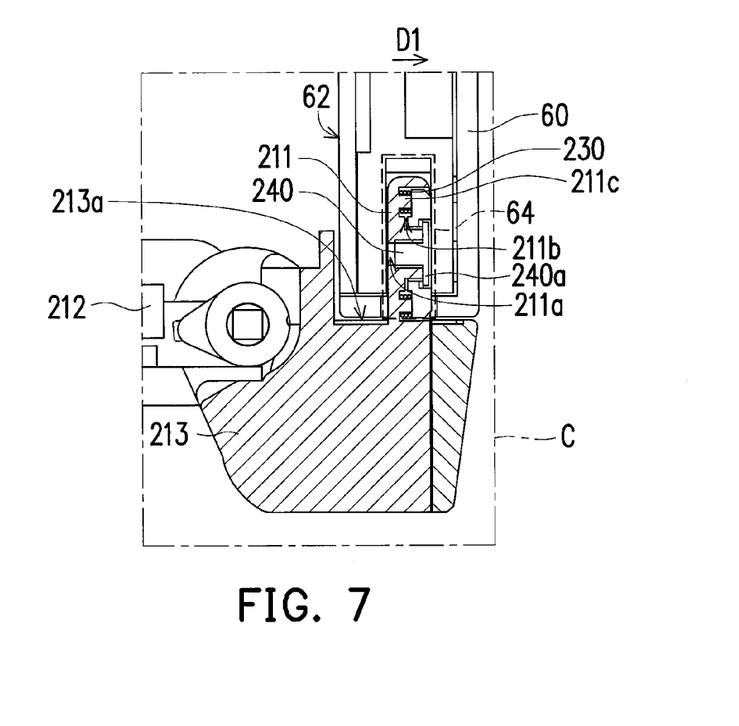
FIG. 7 is a schematic cross-sectional view illustrating the region C in FIG. 6.

FIG. 4 is a schematic view illustrating a docking station and a portable electronic device before assembly according to an embodiment of the invention. FIG. 5 is a schematic cross-sectional view illustrating the region B depicted in FIG. 4. FIG. 6 is a schematic view illustrating the docking station and the portable electronic device depicted in FIG. 4 after assembly. FIG. 7 is a schematic cross-sectional view illustrating the region C in FIG. 6. With reference to FIG. 4 to FIG. 7, in the present embodiment, the docking station 200 serves to assemble the portable electronic device 60, and the portable electronic device 60 is, for instance, a tablet PC, a smart phone, or a personal digital assistant (PDA). The portable electronic device 60 has a display screen 62 and a slot 64. The docking station 200 includes a body 210, a pressing member 220, and an elastic member 230. The body 210 has a protrusion 211. The protrusion 211 is suitable for being lodged in the slot 64, such that the portable electronic device 60 and the docking station 200 are assembled to each other. The pressing member 220 is movably arranged in the protrusion 211. The elastic member 230 is located in the protrusion 211 and is in contact with the body 210 and the pressing member 220. Besides, the elastic member 230 constantly drives the pressing member 220 to move out of the protrusion 211 and to press against the inside of the slot 64 along a pressing direction D1. Here, the pressing direction D1 is perpendicular to the display screen 62.

In the present embodiment, the body 210 is made of metal, for instance. The body 210 includes a host 212 and a support member 213 that are pivoted to each other. Here, the host 212 is a keyboard module or any other add-ons, for instance. The protrusion 211 is located on the support member 213 and is capable of being lodged in the slot 64, such that the portable electronic device 60 can be held by a support surface 213a of the support member 213 and can rotate relative to the host 212 together with the support member 213. Thereby, the portable electronic device 60 may be folded on the host 212 or unfolded relative to the host 212. The user may also adjust the angle at which the portable electronic device 60 is unfolded relative to the host 212, so as to obtain an appropriate viewing angle.

The pressing member 220 is constituted by a rigid material, and the rigid material may be a metal material identical to that of the body 210. In general, a Teflon layer (not shown) may be placed on a surface of the pressing member 220 and a surface of the protrusion 211. Here, the Teflon layer is respectively formed on the surface of the pressing member 220 and the surface of the protrusion 211 by coating or adhesion, so as to reduce the abrasion caused by disassembling or assembling the portable electronic device 60 and the docking station 200.

With reference to FIG. 4 and FIG. 5, in the present embodiment, the docking station 200 further includes a screw locking member 240. The screw locking member 240 slides into the pressing member 220 and is locked to a threaded hole 211a of the protrusion 211, so as to assemble the pressing member 220 into a groove 211b of the protrusion 211. When the portable electronic device 60 is not assembled to the body 210, a portion of the pressing member 220 protrudes from the groove 211b. To be specific, the screw locking member 240 is a blunt bolt, and an outer diameter of the head 240a of the screw locking member 240 is greater than an inner diameter of the threaded hole 211a. Namely, when the elastic member 230 drives the pressing member 220 to move out of the protrusion 211, the head 240a of the screw locking member 240 stops the pressing member 220 and keeps the pressing member 220 to stay in the groove 211b, so as to prevent the pressing member 220 from being pushed by the elastic member 230 and then leaving the body 210.

The protrusion 211 further has a protruding pillar 211c located in the groove 211b, and the protruding pillar 211c is parallel to the support surface 213a of the support member 213 and is extended toward the pressing member 220. In the present embodiment, the elastic member 230 is a compression spring into which the protruding pillar 211c is inserted, for instance, so as to fix the relative positions of the elastic member 230 and the pressing member 220. As shown in FIG. 6 and FIG. 7, when the protrusion 211 is lodged in the slot 64, the elastic member 230 is further compressed, such that the pressing member 220 moves toward the inside of the groove 211b and is then hidden in the body 210. However, the pushing force of the elastic member 230 still drives the pressing member 220 to press against the inside of the slot 64 along the pressing direction D1. That is, through said configuration, after the portable electronic device 60 and the docking station 200 are assembled, the gap between the protrusion 211 and the slot 64 may be removed. Thereby, the portable electronic device 60 may be stably fixed to the support member 213 of the body 210, and the support stability of the docking station 200 may be significantly improved, so as to guarantee the favorable quality of using the portable electronic device 60.

Figure 8:
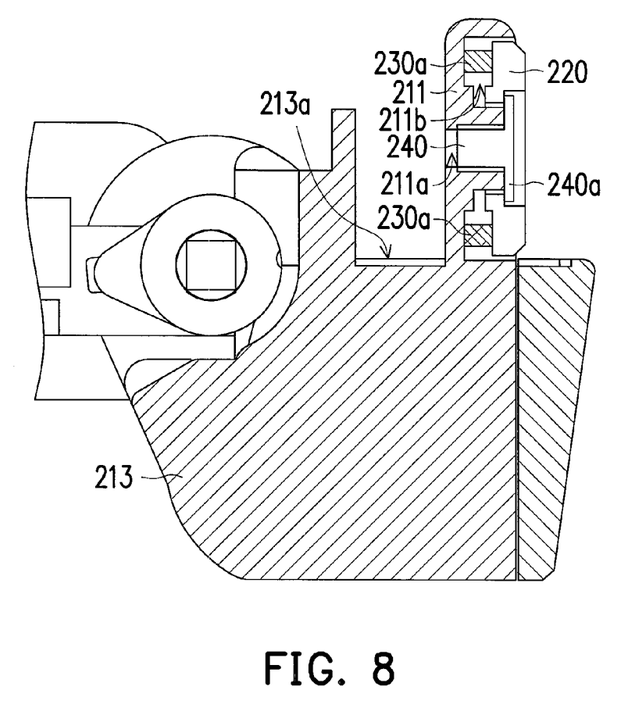
FIG. 8 is a schematic partial cross-sectional view illustrating a docking station according to another embodiment of the invention.

FIG. 8 is a schematic partial cross-sectional view illustrating a docking station according to another embodiment of the invention. With reference to FIG. 8, in the present embodiment, the elastic member 230a is a rubber washer located in the groove 211b, for instance, so as to drive the pressing member 220 to move out of the protrusion 211. When the protrusion 210 is lodged in the slot 64, the elastic member 230a is compressed, such that the pressing member 220 may be hidden in the body 210. However, the elastic restoration force of the elastic member 230 may drive the pressing member 220 to press against the inside of the slot 64; further, the gap formed between the protrusion 211 and the slot 64 after the portable electronic device 60 and the docking station 200 are assembled may be removed, so as to achieve the same effects accomplished in the previous embodiment.

Figure 9:
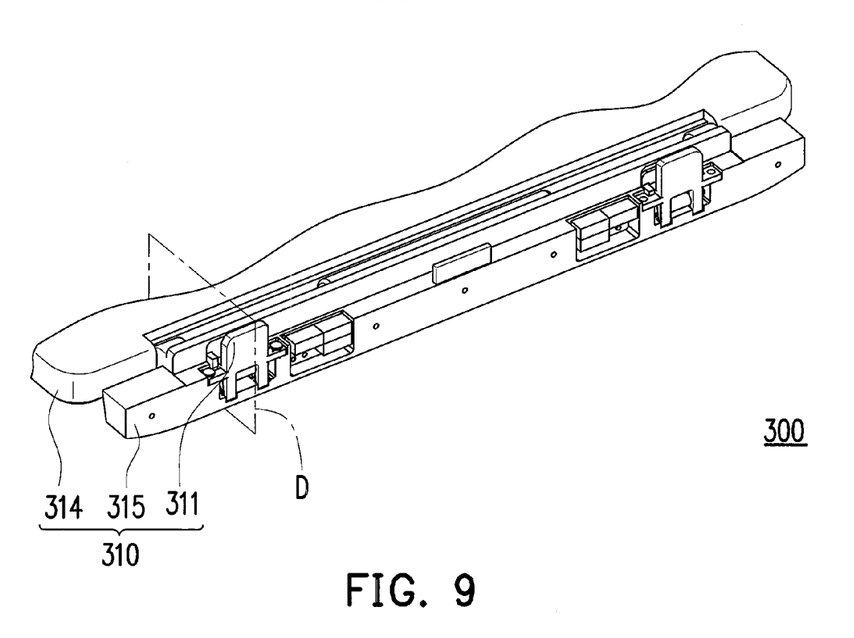
FIG. 9 is a schematic partial three-dimensional view illustrating a docking station according to yet another embodiment of the invention.
Figure 10:
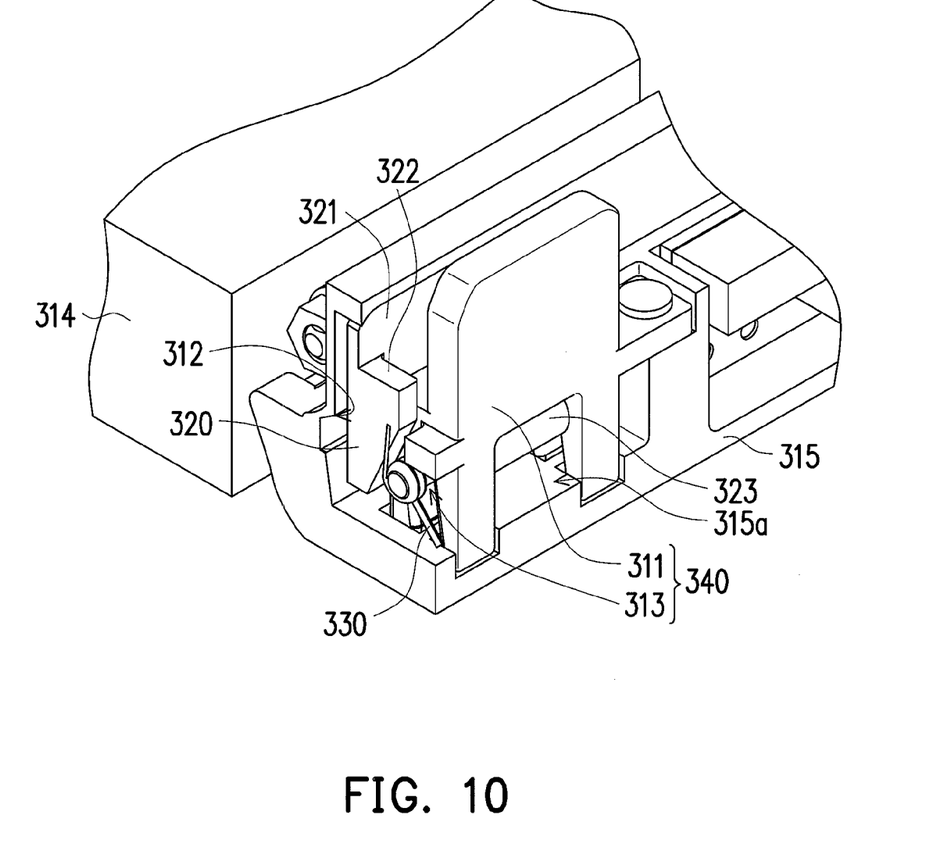
FIG. 10 is a schematic cross-sectional view illustrating the region D depicted in FIG. 9.
Figure 11:
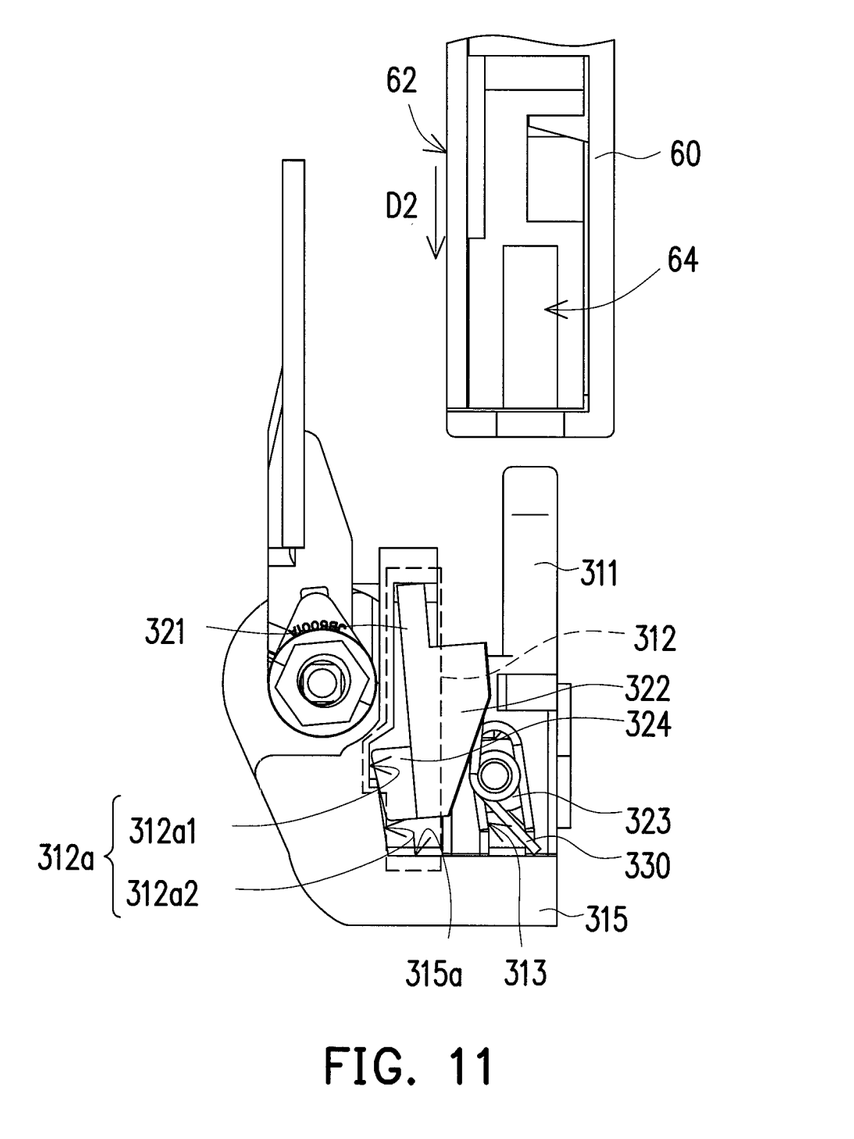
FIG. 11 is a schematic partial cross-sectional view illustrating the docking station and the portable electronic device depicted in FIG. 9 before assembly.
Figure 12:
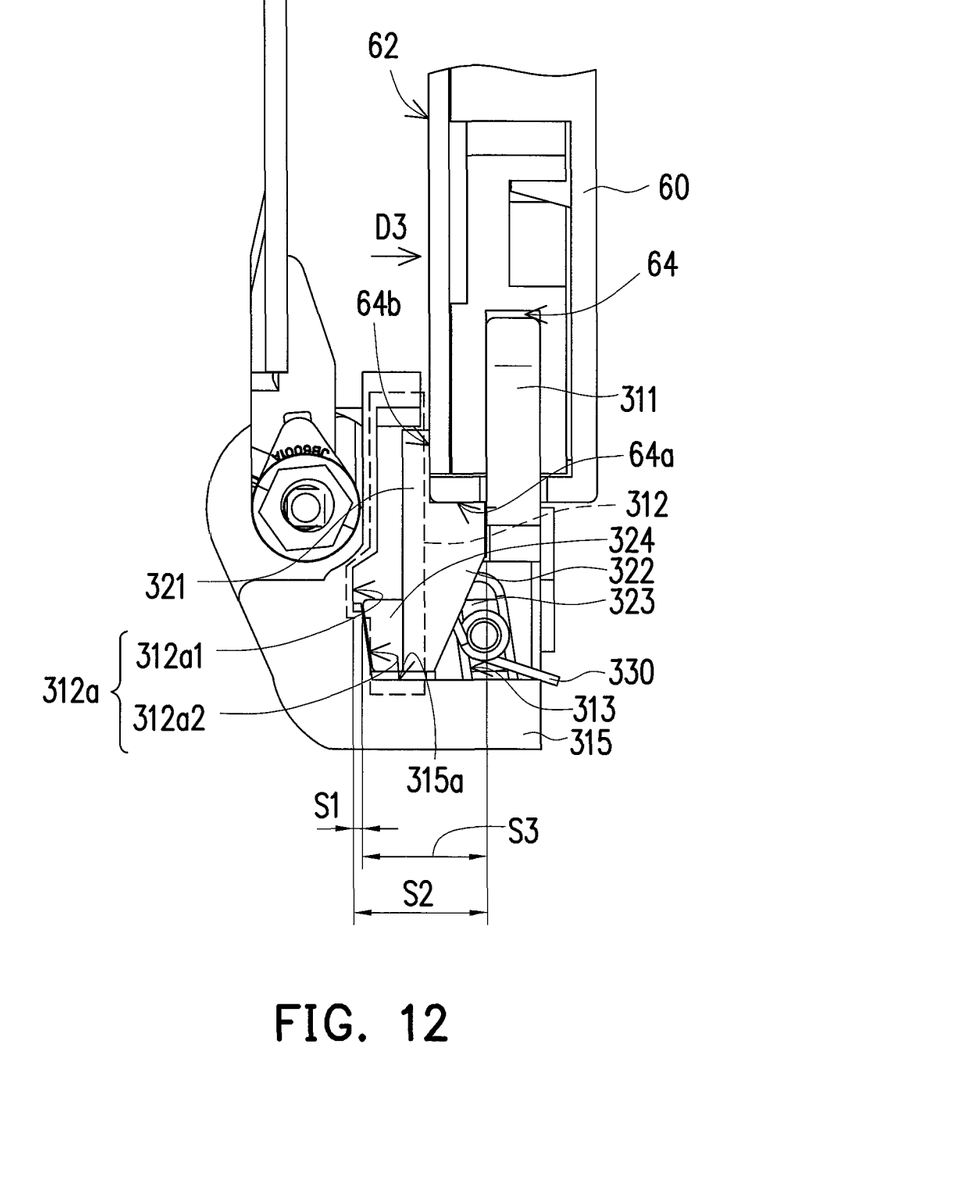
FIG. 12 is a schematic partial cross-sectional view illustrating the docking station and the portable electronic device depicted in FIG. 11 after assembly.

FIG. 9 is a schematic partial three-dimensional view illustrating a docking station according to yet another embodiment of the invention. FIG. 10 is a schematic cross-sectional view illustrating the region D depicted in FIG. 9. FIG. 11 is a schematic partial cross-sectional view illustrating the docking station and the portable electronic device depicted in FIG. 9 before assembly. FIG. 12 is a schematic partial cross-sectional view illustrating the docking station and the portable electronic device depicted in FIG. 11 after assembly. With reference to FIG. 9 to FIG. 12, in the present embodiment, the docking station 300 serves to assemble the portable electronic device 60, and the portable electronic device 60 has a display screen 62 and a slot 64. The docking station 300 includes a body 310, a pressing member 320, and an elastic member 330. The body 310 has a protrusion 311, a recess 312, and a sliding groove 313 that are adjacent to one another. The pressing member 320 is slidably pivoted to the sliding groove 313 and located in the recess 312. The elastic member 330 is in contact with the pressing member 320 and the body 310, and the elastic member 330 constantly drives the pressing member 320 to move into the recess 312. When the portable electronic device 60 enables the protrusion 311 to be inserted into the slot 64 along an assembling direction D2, the portable electronic device 60 presses against the pressing member 320 along the assembling direction D2, so as to drive the pressing member 320 to slide along the sliding groove 313, rotate, and move out of the recess 312. Besides, the pressing member 320 presses against the portable electronic device 60 along a pressing direction D3, such that the portable electronic device 60 is clamped by the pressing member 320 and the protrusion 311. Here, the assembling direction D2 is parallel to the display screen 62, and the pressing direction D3 is perpendicular to the display screen 64.

In the present embodiment, the body 310 is made of metal, for instance. The body 310 includes a host 314 and a support member 315 that are pivoted to each other. Here, the host 314 is a keyboard module or any other add-ons. Specifically, the support member 315 has a bottom surface 315a, and the protrusion 311 and the recess 312 are vertically arranged on the bottom surface 315a. The recess 312 faces the protrusion 311. The pressing member 320 is located between the recess 311 and the protrusion 312, the sliding groove 313 is located below the protrusion 311, and the protrusion 311 is lodged in the slot 64, such that the portable electronic device 60 is held by the support member 315 and rotates relative to the host 314 together with the support member 315.

According to the present embodiment, the protrusion 311 and the sliding groove 313 are parts of one structural member 340 that is assembled onto the bottom surface 315a; however, in another embodiment of the invention not shown in the drawings, the structural member and the support member 15 may be integrally formed.

With reference to FIG. 10 and FIG. 11, in the present embodiment, the pressing member 320 has a pressing portion 321, a holding portion 322, and a pivoting portion 323. The pivoting portion 323 is slidably pivoted to the sliding groove 313. Besides, the pivoting portion 323 is inserted into the elastic member 330, and the elastic member 330 is a torsion spring which constantly drives the pressing member 320 to move toward the recess 312. The holding portion 322 adjoins the pressing portion 321 and the pivoting portion 323 and is located outside the recess 312, and the pressing portion 321 is located above the pivoting portion 323 and faces the protrusion 311.

The pressing member 320 further has a leaning portion 324. The leaning portion 324 is extended from the pivoting portion 323 toward a direction away from the sliding groove 313 and is located below the holding portion 322. The holding portion 324 slidably presses against an inner wall 312a of the recess 312, such that the sliding groove 313 and the inner wall 312a provide the pressing member 320 with a route for sliding and rotating relative to the body 310. In detail, the inner wall 312a may be divided into a first guiding surface 312a1, a second guiding surface 312a2, and a step S1 between the first guiding surface 312a1 and the second guiding surface 312a2. The first guiding surface 312a1 and the second guiding surface 312a2 have an up-and-down layout, and the second guiding surface 312a2 adjoins the bottom surface 315a. A distance S2 from the first guiding surface 312a1 to the protrusion 311 is greater than a distance S3 from the second guiding surface 312a2 to the protrusion 311. When the portable electronic device 60 is not assembled to the body 310, the leaning portion 324 presses against the first guiding surface 312a1, and the pressing portion 321 is located in the recess 312 due to said distances S2 and S3.

When the portable electronic device 60 enables the protrusion 311 to be inserted into the slot 64 along the assembling direction D2, the sidewall 64a of the slot 64 presses against the holding portion 322 along the assembling direction D2, and the leaning portion 324 slides from the first guiding surface 312a1 to the second guiding surface 312a2. Further, due to said distances S2 and S3, the pivoting portion 323 is driven to slide along the sliding groove 313, and the pressing member 320 is rotated and moved out of the recess 312. Here, the leaning portion 324 presses against the second guiding surface 312a2, and the pressing portion 321 is moved out of the recess 312 and is in contact with the sidewall 64b along the pressing direction D3. Thereby, the portable electronic device 60 may be stably clamped by the protrusion 311 and the pressing portion 321, and thus the support stability of the docking station 300 may be significantly improved. In addition, a rubber layer (not shown) may be selectively located on the pressing portion 321, such that the pressing portion 321 of the pressing member 320 may be in close contact with the sidewall 64b by means of the rubber layer (not shown); at the same time, the rubber layer (not shown) may serve as a cushion for preventing abrasion among components.

To sum up, the docking station described herein includes the body, the pressing member, and the elastic member. The pressing member is movably arranged in the body by means of the elastic member, so as to be hidden in the body or moved out of the body. In an embodiment of the invention, when the protrusion of the body is lodged in the slot of the portable electronic device, the elastic member is further compressed, such that the pressing member moves toward the groove of the protrusion and is then hidden in the body. However, the pushing force of the elastic member still constantly drives the pressing member to press against the inside of the slot along the pressing direction. Thereby, after the portable electronic device and the docking station described in an embodiment are assembled, the gap between the protrusion and the slot may be removed. Moreover, according to another embodiment of the invention, if the portable electronic device enables the protrusion to be inserted into the slot along the assembling direction, the leaning portion slides from the first guiding surface of the inner wall of the recess to the second guiding surface. At this time, the leaning portion presses against the second guiding surface, and the pressing portion is moved out of the recess. As such, the portable electronic device may be securely clamped by the protrusion and the pressing portion. In conclusion, the docking station described herein may fix the portable electronic device to the support member of the docking station, so as to significantly enhance support stability of the docking station. Thereby, favorable quality of using the portable electronic device may be ensured.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A docking station capable of assembling a portable electronic device, the portable electronic device having a display screen and a slot, the docking station comprising:
   a body having a protrusion suitable for being lodged in the slot, such that the portable electronic device and the docking station are assembled to each other;
   a pressing member movably arranged in the protrusion; and
   an elastic member located in the protrusion, the elastic member being in contact with the body and the pressing member and constantly driving the pressing member to move out of the protrusion and to press against an inside of the slot along a pressing direction, wherein the pressing direction is perpendicular to the display screen.

2. The docking station as recited in claim 1, further comprising a screw locking member sliding into the pressing member, the screw locking member being locked to a threaded hole of the protrusion, so as to assemble the pressing member into a groove of the protrusion,
   wherein a portion of the pressing member protrudes from the groove when the portable electronic device is not assembled to the body.

3. The docking station as recited in claim 2, wherein the protrusion further has a protruding pillar located in the groove and extended toward the pressing member, and the protruding pillar is inserted into the elastic member.

4. The docking station as recited in claim 1, wherein the body comprises a host and a support member pivoted to each other, and the support member has the protrusion lodged in the slot, such that the portable electronic device is suitable for being held by the support member and rotating relative to the host together with the support member.

5. A docking station capable of assembling a portable electronic device, the portable electronic device having a display screen and a slot, the docking station comprising:
   a body having a protrusion, a recess, and a sliding groove adjacent to one another;
   a pressing member slidably pivoted to the sliding groove and located in the recess; and
   an elastic member in contact with the pressing member and the body, the elastic member constantly driving the pressing member to move into the recess, wherein when the portable electronic device enables the protrusion to be inserted into the slot along an assembling direction, the portable electronic device presses against the pressing member along the assembling direction, so as to drive the pressing member to slide along the sliding groove, rotate, and move out of the recess, the pressing member presses against the portable electronic device along a pressing direction, such that the portable electronic device is clamped by the pressing member and the protrusion, the assembling direction is parallel to the display screen, and the pressing direction is perpendicular to the display screen.

6. The docking station as recited in claim 5, wherein the body comprises a host and a support member pivoted to each other, the support member has a bottom surface, the protrusion and the recess are vertically arranged on the bottom surface, the recess faces the protrusion, the pressing member is located between the recess and the protrusion, the sliding groove is located below the protrusion, and the protrusion is lodged in the slot, such that the portable electronic device is held by the support member and rotates relative to the host together with the support member.

7. The docking station as recited in claim 6, wherein the pressing member has a pressing portion, a holding portion, and a pivoting portion, the pivoting portion is slidably pivoted to the sliding groove and inserted into the elastic member, the elastic member is in contact with the protrusion and the bottom surface of the support member, the holding portion adjoins the pressing portion and the pivoting portion and is located outside the recess, and the pressing portion is located above the pivoting portion and faces the protrusion.

8. The docking station as recited in claim 7, wherein the pressing member further has a leaning portion extended from the pivoting portion toward a direction away from the sliding groove, the leaning portion is located below the holding portion, the holding portion slidably presses against an inner wall of the recess, and the sliding groove and the inner wall provide the pressing member with a route for sliding and rotating relative to the body.

9. The docking station as recited in claim 8, wherein the inner wall is divided into a first guiding surface, a second guiding surface, and a step between the first guiding surface and the second guiding surface, the first guiding surface and the second guiding surface have an up-and-down layout, the second guiding surface adjoins the bottom surface, a distance from the first guiding surface to the protrusion is greater than a distance from the second guiding surface to the protrusion, and when the leaning portion presses against the first guiding surface, the pressing portion is located in the recess, and when the leaning portion presses against the second guiding surface, the pressing portion is moved out of the recess.

10. A docking station capable of installing a portable electronic device, the portable electronic device having a display screen and a slot, the docking station comprising:
    a body having a protrusion; and
    a pressing member movably arranged in the body, so as to be hidden in the body or moved out of the body, wherein when the portable electronic device is locked with the protrusion through the slot, the pressing member is moved out of the body and presses against the portable electronic device along a pressing direction, such that the portable electronic device is fixed onto the body, and the pressing direction is perpendicular to the display screen.

11. The docking station as recited in claim 10, further comprising an elastic member located in the protrusion, the elastic member being in contact with the body and the pressing member and constantly driving the pressing member to move out of the protrusion and to press against an inside of the slot along the pressing direction.

12. The docking station as recited in claim 11, further comprising a screw locking member sliding into the pressing member, the screw locking member being locked into a threaded hole of the protrusion, so as to assemble the pressing member into a groove of the protrusion,
    wherein a portion of the pressing member protrudes from the groove when the portable electronic device is not assembled to the body.

13. The docking station as recited in claim 12, wherein the protrusion further has a protruding pillar located in the groove and extended toward the pressing member, and the protruding pillar is inserted into the elastic member.

14. The docking station as recited in claim 10, wherein the body comprises a host and a support member pivoted to each other, and the support member has the protrusion lodged in the slot, such that the portable electronic device is suitable for being held by the support member and rotating relative to the host together with the support member.

15. The docking station as recited in claim 14, further comprising an elastic member in contact with the pressing member and the body, the body having the protrusion, a recess, and a sliding groove adjacent to one another, the elastic member constantly driving the pressing member to move into the recess, wherein when the portable electronic device enables the protrusion to be inserted into the slot along an assembling direction, the portable electronic device presses against the pressing member along the assembling direction, so as to drive the pressing member to slide along the sliding groove, rotate, and move out of the recess, the pressing member presses against the portable electronic device along the pressing direction, such that the portable electronic device is clamped by the pressing member and the protrusion, and the assembling direction is parallel to the display screen.

16. The docking station as recited in claim 15, wherein the support member has a bottom surface, the recess and the protrusion are vertically arranged on the bottom surface, the recess faces the protrusion, the pressing member is located between the recess and the protrusion, and the sliding groove is located below the protrusion.

17. The docking station as recited in claim 16, wherein the pressing member has a pressing portion, a holding portion, and a pivoting portion, the pivoting portion is slidably pivoted to the sliding groove and inserted into the elastic member, the elastic member is in contact with the protrusion and the bottom surface of the support member, the holding portion adjoins the pressing portion and the pivoting portion and is located outside the recess, and the pressing portion is located above the pivoting portion and faces the protrusion.

18. The docking station as recited in claim 17, wherein the pressing member further has a leaning portion extended from the pivoting portion toward a direction away from the sliding groove, the leaning portion is located below the holding portion, the holding portion slidably presses against an inner wall of the recess, and the sliding groove and the inner wall provide the pressing member with a route for sliding and rotating relative to the body.

19. The docking station as recited in claim 18, wherein the inner wall is divided into a first guiding surface, a second guiding surface, and a step between the first guiding surface and the second guiding surface, the first guiding surface and the second guiding surface have an up-and-down layout, the second guiding surface adjoins the bottom surface, when the leaning portion presses against the first guiding surface, the pressing portion is located in the recess, and when the leaning portion presses against the second guiding surface, the pressing portion is moved out of the recess.

20. The docking station as recited in claim 19, wherein a distance from the first guiding surface to the protrusion is greater than a distance from the second guiding surface to the protrusion.

* * * * *